US005758425A

United States Patent [19]

Gallagher et al.

[11] Patent Number: 5,758,425

[45] Date of Patent: Jun. 2, 1998

[54] DEPTH-OF-CUT MECHANISM FOR CIRCULAR SAW

[75] Inventors: P. Sean Gallagher, Des Plaines, Ill.; Dale M. Flowers, Ballwin, Mo.; Gregg M. Mangialardi, Park Ridge, Ill.

[73] Assignee: S-B Power Tool Company, Chicago, Ill.

[21] Appl. No.: 859,294

[22] Filed: May 20, 1997

[51] Int. Cl.$^{6}$ .......... B23D 47/02

[52] U.S. Cl. .......... 30/376; 30/390

[58] Field of Search .......... 30/375, 376, 390, 30/391

[56] References Cited

U.S. PATENT DOCUMENTS

| | | | |
|---|---|---|---|
| 1,803,068 | 4/1931 | McKeage | 30/390 |
| 1,830,579 | 11/1931 | Wappat | 30/391 |
| 3,706,332 | 12/1972 | George | 30/391 |
| 4,516,324 | 5/1985 | Heininger, Jr. et al. | 30/391 |
| 4,589,208 | 5/1986 | Iwasaki et al. | 30/376 |
| 4,856,394 | 8/1989 | Clowers | 30/390 |
| 4,982,501 | 1/1991 | Sauerwein et al. | 30/376 |
| 5,121,545 | 6/1992 | Nonaka et al. | 30/376 |
| 5,570,511 | 11/1996 | Reich et al. | 30/376 |

*Primary Examiner*—Hwei-Siu Payer
*Attorney, Agent, or Firm*—Jones, Day, Reavis & Pogue

[57] ABSTRACT

A circular saw has a housing enclosing a motor for driving an output shaft about an axis of rotation. An upper bladeguard is immovably secured to the housing and has a rear wall defining an arcuate slot. A rectangular base plate is pivotally attached at its forward portion to the saw housing for swinging movement about a pivot axis parallel with the output shaft and disposed substantially forwardly thereof. An arcuate bracket arm has one end thereof connected to the rear of the base plate. A fastening element is mounted on the other end of the bracket arm and is received within the slot in the upper bladeguard. The operator may adjust the base plate by grasping the fastening element and moving the same along the slot in the upper bladeguard.

5 Claims, 2 Drawing Sheets

DEPTH-OF-CUT MECHANISM FOR CIRCULAR SAW

The present invention relates to circular saws. More particularly, the present invention relates to an adjustable depth-of-cut mechanism for a circular saw.

BACKGROUND OF THE INVENTION

Circular saws are in wide-spread use. A circular saw of the type under consideration includes a housing enclosing a motor, usually an electric motor, for powering an output shaft. A circular saw blade is mounted on the output shaft for rotation in a plane perpendicular to the axis of rotation of the shaft. The circular saw includes an upper bladeguard and a movable or swingable lower bladeguard. The circular saw is also provided with a generally rectangular base plate having an elongated opening for receiving the lower bladeguard and blade. The base plate is mounted to the housing of the circular saw for swinging movement about an axis parallel with the axis of rotation of the output shaft. Adjustment means are provided for releasably positioning the base plate relative to the tool housing for limiting the depth-of-cut.

Most of these prior art circular saws require the use of both of the operator's hands to adjust the depth-of-cut. The operator must place the saw on some supporting surface and release his hand from the primary handle of the saw, i.e., the handle that includes the actuating trigger. The operator will then use one of his hands to release the depth adjustment knob and the other hand will be used to grasp the base plate for swinging the base plate to the desired position depending on the depth-of-cut required. The operator will tighten the adjustment knob and then grip the primary handle of the saw to resume the cutting or sawing operation. In the prior art saws, the base plate is pivotally mounted to the housing about a forward pivot axis. An adjustment knob is mounted to the upper bladeguard and is received within a slot formed in a bracket arm which is attached to the base plate. Examples of this type of circular saw are the Makita 500BA circular saw and the Black & Decker KS 865 circular saw.

The prior art does include a circular saw having a base plate which can be adjusted using only one hand. This saw is manufactured by Black & Decker as the DeWalt model 364 circular saw. This saw includes a base plate which is pivoted to the housing adjacent the rear of the base plate. This rear pivotal attachment of the base plate to the housing requires that the upper bladeguard move relative to the motor housing during adjustment of the depth-of-cut. Consequently, a complicated linkage mechanism is required. If the upper bladeguard of this prior art tool did not move relative to the motor housing during pivoting movement of the base plate (1) an area of the blade would be exposed between the upper and lower guards thus raising safety issues and (2) the workpiece would be contacted by the lower guard outside leading edge rather than by the circular saw blade.

SUMMARY AND OBJECTS OF THE INVENTION

The present invention provides a new and improved depth-of-cut adjustment mechanism for a circular saw whereby the upper bladeguard may be immovably mounted with respect to the motor housing and whereby the depth-of-cut adjustment may be made using only one of the operator's hands.

A primary object of the present invention is the provision of a simplified depth-of-cut adjustment mechanism for a circular saw requiring only one hand operation.

Another object of the present invention is the provision of a depth-of-cut adjustment mechanism which is simple in construction and which does not require relative movement between the upper bladeguard and the motor housing during movement of the base plate for establishing the desired depth-of-cut.

Yet another object of the present invention is the provision of a depth-of-cut mechanism of the type described which facilitates locating depth-of-cut indicia means on the saw housing.

These and other objects and advantages of the invention will become apparent from the following specification disclosing a preferred embodiment.

DESCRIPTION OF A PREFERRED EMBODIMENT

Figure 1:
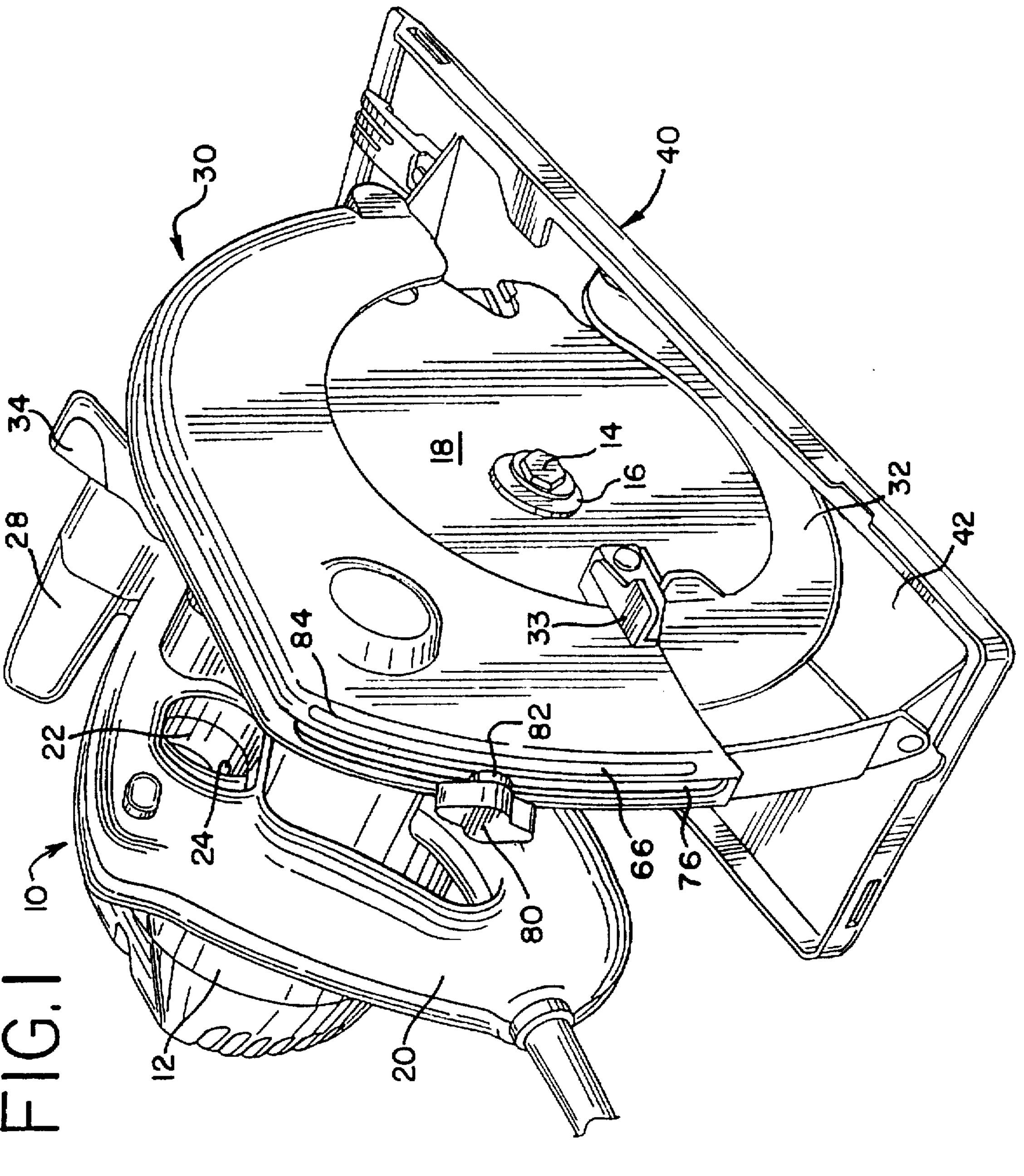
FIG. 1 is an isometric view of a circular saw embodying the present invention, as seen from the rear and right side of the saw.

Referring primarily to FIG. 1, a circular saw, generally designated 10, includes a housing 12 enclosing and supporting an electric motor (not shown). It will be understood that this motor includes an output shaft having a threaded bore for receiving a fastener 14. The fastener engages a washer 16 which in turn engages a circular saw blade 18 for mounting the same on the output shaft for rotation in a plane perpendicular to the axis of rotation of the output shaft.

The housing 12 includes a handle 20. This handle includes an aperture 22 enclosing the operating trigger 24. Thus, the handle 20 is the primary handle and is normally gripped by the operator's right hand. The operator's trigger finger is received within the aperture 22 for squeezing the trigger 24 thereby to energize the electric motor. The circular saw is preferably provided with an auxiliary handle 28 suitably supported from the housing 12. This auxiliary handle may be grasped by the operator's left hand.

The circular saw includes an upper bladeguard, generally designated 30. It will be understood that this upper bladeguard is fixed to the housing 12. In other words, there is no relative movement between the upper bladeguard and the housing 12.

The circular saw also includes a lower bladeguard 32. It will be understood that this lower bladeguard is mounted for swinging movement about an axis coaxial with or parallel to the axis of rotation of the output shaft of the motor. The lower bladeguard may be swung between open and closed positions in a manner known to those skilled in the art. In this regard, a bracket 33 is connected to the lower bladeguard. The operator may grasp this bracket for swinging the lower bladeguard.

The saw preferably includes a remote mechanism for the lower guard 32. This mechanism includes a lever 34 mounted adjacent the auxiliary handle 28. The remote lower guard lift mechanism is preferably of the type disclosed and claimed in copending application, Ser. No. 08/859,294, filed May 20, 1997, Attorney Docket No. 970303, assigned to the assignee of the present invention. In accordance with this mechanism, the lever 34 may be depressed by the operator's left hand while continuing to grasp the auxiliary handle 28; such movement of the lever 34 will cause the lower guard to swing to its open position.

The circular saw includes the usual base or foot plate, generally designated 40. The base plate includes an elongated opening 42 for receiving the lower bladeguard 32.

Figure 2:
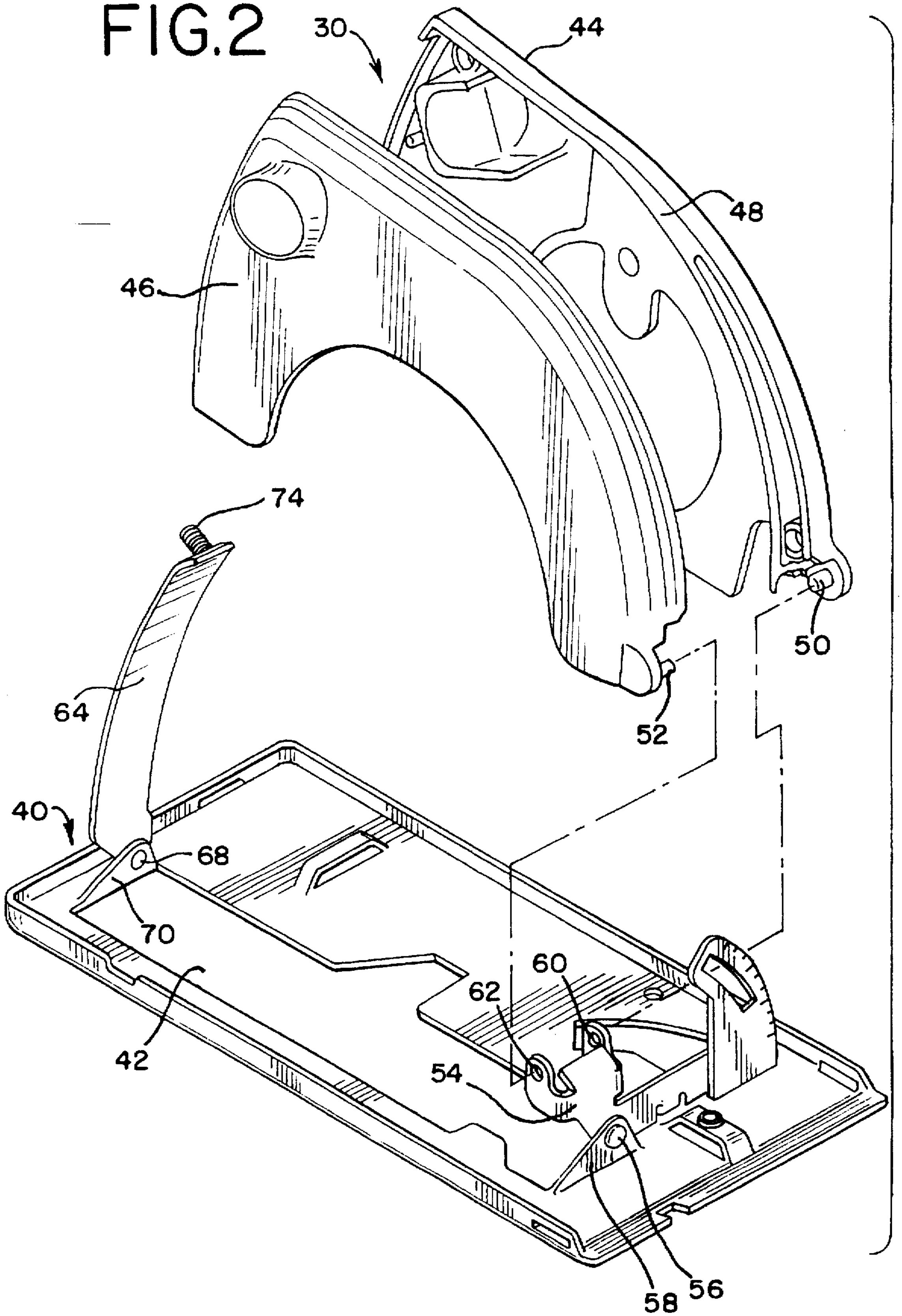
FIG. 2 is an exploded isometric view showing the base plate and the two shells which constitute the upper bladeguard.

Referring now primarily to FIG. 2, it will be seen that the upper bladeguard 30 comprises left and right upper shells 44 and 46, respectively. These shells include mating edges 48 which are joined in a plane perpendicular to the axis of rotation of the motor output shaft. The shells 44, 46 may be joined by any suitable means, such as by welding, fusing, or by the use of fasteners, depending on the type of material employed to form the upper guard.

It will be noted that the shells 44, 46 include respective pivot pins 50 and 52. When the shells 44 and 46 are secured to each other, the pivot pins 50 and 52 are in opposed, coaxial spaced relationship.

The base or foot plate 40 has a mounting bracket 54 at its forward end. This mounting bracket is connected to a pin 56 received in an ear 58 integrally formed in the base plate. Mounting bracket 54 includes ears having respective apertures 60 and 62. It will be understood that the apertures 60 and 62 of the mounting bracket receive the pins 50 and 52, respectively. Thus, the base plate 40 is mounted to the upper bladeguard for pivoting movement about an axis parallel with the axis of rotation of the output shaft, such axis being spaced substantially forwardly of the axis of rotation of the output shaft.

The base plate 40 also includes an arcuate bracket arm 64 which is formed to correspond to the curvature of rear wall 66 (FIG. 1) of the upper bladeguard. The bracket arm 64 is pivotally engaged by a pin 68 received in an ear 70 integrally formed in the base plate. At this point, it should be mentioned that the pins 56 and 68 are coaxial thus permitting the base plate to be pivoted about an axis perpendicular to the axis of rotation of the motor output shaft thereby to provide for bevel cutting, all in the manner known to those skilled in the art.

Turning again to the bracket arm 64, it will be seen that the same mounts a threaded pin 74 adjacent the distal end of the arm 64. Pin 74 is received within a slot 76 formed in the arcuate rear wall 66 of the upper bladeguard 30. The pin 74 is threadingly engaged with a knob 80 as best seen in FIG. 1. The knob 80 has an annular portion 82 arranged for frictional engagement with the exterior surfaces of the rear wall 66 on each side of the slot 76.

When it is desired to adjust the depth-of-cut, the operator, continuing to grip the primary handle 20 with his right hand, may remove his left hand from the auxiliary grip 28 and grasp the knob 80. Knob 80 is then unscrewed or released for sliding the pin 74 to the desired position in the slot 76. This movement of the knob 80 and pin 74 causes swinging movement of the base plate about the pivot axis defined by the pins 50 and 52. When the operator has established the desired depth-of-cut, the knob 80 is turned for tightly frictionally engaging the knob formation 82 with the outer surface of the rear wall 66. These operations can be achieved by the operator's left while continuing to grasp the primary handle 20 with the operator's right hand.

Preferably, numerical indicia means, indicated at 84, are suitably formed on the exterior surface of the rear wall 66 of the upper bladeguard adjacent the slot 76. This indicia facilitates positioning of the knob 82 to establish the desired depth-of-cut.

It is seen that the present invention provides a mechanism permitting one-hand adjustment of the base or foot plate to obtain the desired depth-of-cut. The mechanism is simple in construction thus lending itself to inexpensive manufacture and highly reliable operation.

It will be apparent to those skilled in the art that the present invention is susceptible of many forms and modifications coming within the scope of the following claims.

We claim:

1. A circular saw having a housing enclosing a motor for driving an output shaft about an axis of rotation, an upper bladeguard immovably secured to said housing, said upper bladeguard having an arcuate rear wall defining an arcuate elongated slot contained in a plane perpendicular to said axis of rotation, a lower bladeguard mounted for swinging movement relative to the upper bladeguard, a rectangular base plate having forward and rearward portions and also having an elongated opening for receiving the lower bladeguard, said saw including means pivotally engaging said base plate at the forward portion thereof for swinging movement of the base plate about a pivot axis parallel with said axis of rotation and disposed substantially forwardly thereof, an arcuate bracket arm having one end thereof connected to the base plate at said rearward portion thereof, a first fastening element mounted on said bracket arm at an end thereof opposite said one end, said first fastening element extending through said arcuate slot, a second hand operable fastening element adjustably connected with said first fastening element, said second fastening element having a portion thereof in releasable frictional engagement with said rear wall of the upper bladeguard whereby an operator may grasp the second fastening element, release the same, reposition the base plate and tighten the second fastening element using only one hand.

2. The circular saw according to claim 1 wherein said first fastening element is in the form of a threaded pin and wherein said second fastening element is in the form of a knob threadingly engaged with said pin.

3. The circular saw according to claim 2 further defined by depth-of-cut indicia means on said rear wall of the upper bladeguard adjacent said arcuate slot.

4. The circular saw according to claim 1 further defined by, said upper bladeguard being defined by first and second shells having respective edge portions engaged with each other in a plane perpendicular to said axis of rotation, said first and second shells having respective coaxial pivot pins in spaced, oppositely disposed relationship, said base plate having a mounting bracket secured thereto at the forward portion of the base plate, said mounting bracket having a pair of coaxial apertures receiving respective ones of said pivot pins and thereby defining said pivot axis of the base plate.

5. The circular saw according to claim 4 wherein said bracket arm and said mounting bracket are mounted to said base plate for pivoting movement about a common axis perpendicular to said axis of rotation.

* * * * *